United States Patent
Kim et al.

(10) Patent No.: US 7,555,066 B2
(45) Date of Patent: *Jun. 30, 2009

(54) E8-VSB RECEPTION SYSTEM

(75) Inventors: Woo Chan Kim, Seongnam-si (KR); In Hwan Choi, Seoul (KR); Young Jin Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 563 days.

This patent is subject to a terminal disclaimer.

(21) Appl. No.: 11/010,030

(22) Filed: Dec. 10, 2004

(65) Prior Publication Data

US 2005/0129145 A1 Jun. 16, 2005

(30) Foreign Application Priority Data

Dec. 12, 2003 (KR) .................. 10-2003-0090704

(51) Int. Cl.
*H03D 1/24* (2006.01)
(52) U.S. Cl. .............. 375/321; 375/270; 375/326; 375/345; 348/723; 348/724; 348/725; 348/470
(58) Field of Classification Search ............... 375/321; 348/21, 614

See application file for complete search history.

(56) References Cited

U.S. PATENT DOCUMENTS 6,021,421 A * 2/2000 Retter et al. ............. 708/422

7,102,692 B1 * 9/2006 Carlsgaard et al. .......... 348/572
2002/0126222 A1 * 9/2002 Choi et al. .................. 348/614
2004/0034491 A1 * 2/2004 Kim ............................ 702/79

FOREIGN PATENT DOCUMENTS

WO WO 03/028379 A1 4/2003

* cited by examiner

*Primary Examiner*—Shuwang Liu
*Assistant Examiner*—Dhaval Patel
(74) *Attorney, Agent, or Firm*—Lee, Hong, Degerman, Kang & Waimey (57) ABSTRACT

An E8-VSB reception system system is provided. A VSB receiver converts a received broadcast signal into a digital baseband signal in synchronization with a first symbol clock, converts a decision signal synchronized with a second symbol clock into a decision signal synchronized with the first symbol clock, performs channel equalizing and noise removal on the digital baseband signal using the converted decision signal, performs error correction on the noise removed signal, and outputs error-corrected data and a synchronization signal in synchronization with the first symbol clock and second symbol clock. A E8-VSB data processor receives the data and the synchronization signal in synchronization with the first symbol clock and second symbol clock from the VSB receiver, extracts enhanced data according to the synchronization signal, performs E8-VSB decoding and error correction, and outputs the decision signal synchronized with the second symbol clock to the VSB receiver.

19 Claims, 6 Drawing Sheets

E8-VSB RECEPTION SYSTEM

This application claims the benefit of the Korean Application No. 10-2003-0090704 filed on Dec. 12, 2003, which is hereby incorporated by reference.

BACKGROUND OF THE INVENTION

1. Field of the Invention

The present invention relates to an enhanced 8-vestigial sideband (E8-VSB) reception system compatible with an Advanced Television Systems Committee (ATSC) VSB reception system of a related art, and more particularly, to an E8-VSB reception system for a signal transfer between a VSB broadcast reception chip manufactured under an existing standard and an enhanced data processing chip, which is a standard for an improved performance.

2. Discussion of the Related Art

For ground-wave digital broadcasting, the United States adopted an ATSC 8VSB transmission type as a standard in 1995 and has broadcasted since a second half of 1998. The Korea adopted the same ATSC 8VSB transmission type as the United States for a standard, broadcasted experimentally in May, 1995, and changed into a test broadcast system on Aug. 31, 2000. Each broadcasting company has performed a digital broadcasting since October 2001.

The ATSC 8VSB transmission type developed for a high quality, high definition (HD) broadcasting transmits Moving Picture Experts Group-2 (MPEG-2) digital image quality and Dolby digital sound. Currently, a system having enhanced performance compared with the ATSC 8VSB transmission type is under development to secure a higher reception rate than the ATSC 8VSB transmission type.

At this point, for a method of improving a reception rate, a coding method having improved error correction ability may be used, for it is possible to receive a digital broadcasting under severe environments where the related art ATSC 8VSB system cannot receive the digital broadcasting if the error correction ability is improved.

Therefore, an E8-VSB standard in a new E8-VSB transmission system compatible with the related art ATSC 8VSB system prescribes that data (referred to as enhanced data hereinafter) coded in such a way that performance improvement may be possible should be multiplexed and transmitted in an inside of the existing VSB signal (hereinafter, referred to as main data).

The related art chip for the VSB digital ground-wave broadcasting reception does not have considerations for a signal transfer to and from the E8-VSB chip, which is the VSB broadcast standard having improved performance and whose standardization is currently under progress.

For convenience in explanation in the following description, the related art VSB reception chip and VSB receiver will be used interchangeably and an enhanced data processing chip and an enhanced data processor will be used interchangeably.

That is, when the main data and the enhanced data are multiplexed and transmitted, the VSB receiver of the E8-VSB reception system which receives those data processes demodulation and equalizing and noise removal in the same manner as the related art VSB receiver. In addition, an error correction decoding process is processed in the same manner as an error correction decoding process of the related art VSB receiver. The enhanced data processor takes over an input from an error correction decoder of the related art VSB receiver and extracts only enhanced data to perform E8-VSB decoding and error correction decoding.

When standardization is preceded in the future and the enhanced data processor comes out in form of a chip, the chip-type enhanced data processor should be connected with the related art VSB receiver and used.

At this point, a signal that should be delivered from the related art VSB receiver to the enhanced data processor requires lots of pins. Therefore, the number of pins necessary for signal transfer to and from the enhanced data processor is increased. Accordingly, when manufacturing the VSB reception chip with consideration of the signal transfer to and from the enhanced data processor, there occurs a problem that the chip should be manufactured in a large size due to an increase in the number of pins.

SUMMARY OF THE INVENTION

Accordingly, the present invention is directed to an E8-VSB reception system that substantially obviates one or more problems due to limitations and disadvantages of the related art.

An object of the present invention is to provide an E8-VSB reception system capable of reducing the number of pins used in each chip by raising a signal transmission speed between a VSB reception chip and an enhanced data processing chip N times faster than a symbol clock.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an E8-VSB reception system includes: a VSB receiver for converting a received broadcast signal of a predetermined channel into a digital baseband signal having a period of a first symbol clock, performing a channel equalizing, a noise removal, and an error correction, and outputting error-corrected data and a synchronization signal with an N times faster speed than the first symbol clock; an enhanced data processor for receiving the first symbol clock and a second symbol clock N times faster than the first symbol clock from the VSB receiver, extracting only enhanced data from the data depending on a synchronization signal outputted in synchronization with the second symbol clock, and performing an E8-VSB decoding and error correction.

The VSB receiver includes: a 1×N symbol clock converter for converting data and a synchronization signal synchronized with a first symbol clock into data and a synchronization signal synchronized with a second symbol clock N times faster than the first symbol clock to output the converted data and signal to an enhanced data processor; and an N×1 symbol clock converter for converting a decision prediction signal and a decision control signal outputted, at the enhanced data processor, in synchronization with the second symbol clock N times faster than the first symbol clock into a decision prediction signal and a decision control signal synchronized with the first symbol clock.

The enhanced data processor includes: a 1×N symbol clock converter for converting a decision prediction signal and a decision control signal synchronized with a first symbol clock into a decision prediction signal and a decision control signal synchronized with a second symbol clock N times faster than the first symbol clock to output the converted signals to the VSB receiver; and an N×1 symbol clock converter for converting data and a synchronization signal outputted, at the VSB receiver, in synchronization with a second symbol clock N times faster than the first symbol clock into data and a synchronization signal synchronized with the first symbol clock.

In another aspect of the present invention, an E8-VSB reception system includes: a VSB receiver for converting a received broadcast signal of a predetermined channel into a digital baseband signal having a period of a first symbol clock, performing a channel equalizing, a noise removal, and an error correction, and outputting error-corrected data and a synchronization signal with a twice faster speed than the first symbol clock; and an E8-VSB data processor for receiving the first symbol clock and a second symbol clock twice faster than the first symbol clock from the VSB receiver, extracting only enhanced data from the data depending on a synchronization signal outputted in synchronization with the second symbol clock, and performing an E8-VSB decoding and error correction.

The VSB receiver includes: a 1×2 symbol clock converter for converting data and a synchronization signal synchronized with a first symbol clock into data and a synchronization signal synchronized with a second symbol clock twice faster than the first symbol clock to output the converted data and signal to an E8-VSB data processor; and a 2×1 symbol clock converter for converting a decision prediction signal and a decision control signal outputted, at the E8-VSB data processor, in synchronization with the second symbol clock twice faster than the first symbol clock into a decision prediction signal and a decision control signal synchronized with the first symbol clock.

The enhanced data processor includes: a 1×2 symbol clock converter for converting a decision prediction signal and a decision control signal synchronized with a first symbol clock into a decision prediction signal and a decision control signal synchronized with a second symbol clock twice faster than the first symbol clock to output the converted signals to the VSB receiver; and a 2×1 symbol clock converter for converting data and a synchronization signal outputted, at the VSB receiver, in synchronization with a second symbol clock twice faster than the first symbol clock into data and a synchronization signal synchronized with the first symbol clock.

The 1×2 symbol clock converter includes: a first selector for sequentially multiplexing and outputting first and second data inputted in synchronization with a first symbol clock using a first selection signal inverted every one period of a second symbol clock; a first delay for storing the first and the second data multiplexed and outputted, at the first selector, in synchronization with a second symbol clock and outputting the same; a second delay for storing a multiplexed data stream outputted, at the first delay, in synchronization with a clock half-period delayed compared to the second symbol clock and outputting the same; and a selection signal generator for receiving a synchronization lock signal synchronized with the first symbol clock to generate a first selection signal inverted every one period of the second symbol clock and output the generated signal to the first selector.

The 2×1 symbol clock converter includes: a delay for receiving and storing a data stream multiplexed in synchronization with a second symbol clock and outputting the data stream in synchronization with the second symbol clock; a first data output unit for separating and outputting first data synchronized with a first symbol clock from the output of the delay according to a third selection signal; a second data output unit for separating and outputting second data synchronized with the second symbol clock from the output of the delay according to a third selection signal; and a selection signal generator for receiving a synchronization lock signal synchronized with the first symbol clock to generate a third selection signal inverted every one period of the second symbol clock and output the generated signal to the first and the second output units.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Construction and operation of the present invention illustrated and explained by the accompanying drawings are explained in descriptive sense only and thus the spirit and crucial construction and operation of the present invention are not limited.

One aspect of the present invention is to reduce the number of pins used in each chip by raising a signal transfer speed between a VSB reception chip and an enhanced data processing chip as much as N times faster than a symbol clock.

Here, N is a natural number of more than 2. At this point, as N increases, it is possible to reduce the number of pins as much as that, but control is complicated thus a most appropriate value is selected depending on system characteristics.

Description of the present invention will be made with N set to 2 for an embodiment.

Figure 1:
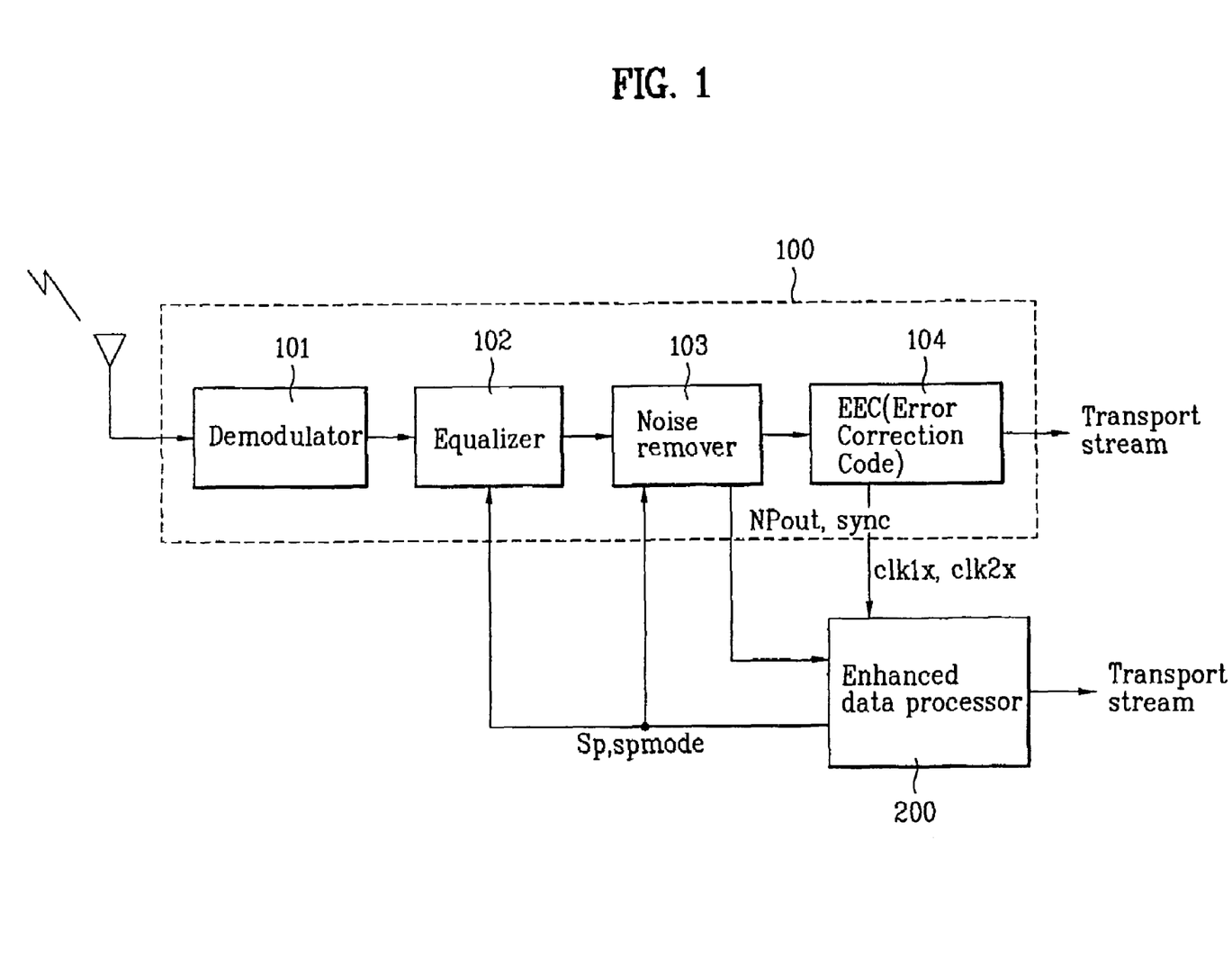
FIG. 1 is a view illustrating an example of a signal flow inputted and outputted between a VSB reception chip and an enhanced data signal processing chip.

FIG. 1 is a view illustrating a VSB receiver and an example of a signal flow inputted and outputted between a VSB receiver and an enhanced data processor in E8-VSB reception system according to the present invention.

The VSB receiver 100 and the enhanced data processor 200 can be realized in a chip, respectively. Though those elements are realized in a chip, they are called the VSB receiver and the enhanced data processor, respectively, for convenience in description of the present invention.

A demodulator 101 of the VSB receiver 100 performs analog/digital(A/D) conversion, carrier demodulation/timing recovery with respect to a broadcast signal of a predetermined channel received through an antenna to convert the signal into a digital baseband signal of a symbol period and output the converted signal to an equalizer 102.

The equalizer 102 compensates for channel distortion included in the digital baseband signal and outputs the signal to a noise remover 103. That is, the equalizer 102 compensates for various fading generated while a signal reaches from a transmitter to a receiver.

The noise remover 103 estimates a noise using an output of the equalizer 102 to remove a noise amplified during the equalizing process and output the signal to an error corrector 104. The error corrector 104 decodes the signal where distortion has been compensated and a noise is removed.

At this point, the enhanced data processor 200 receives a clk1x signal, which is a symbol period clock, and a clk2x signal, which has a half of the symbol period from the VSB receiver 100. That is, a frequency of the clk2x is twice that of the clk1x. The enhanced data processor 200 receives an error-corrected data signal Npout and synchronization signals sync from the error corrector 104 of the VSB receiver 100.

When receiving the data and the synchronization signals from the error corrector 104 of the VSB receiver 100, the enhanced data processor 200 outputs a decision prediction signal (slice prediction; Sp[1:0]) and a decision control signal (Spmode[1:0]) having more increased and improved reliability to the equalizer 102 and the noise remover 103 of the VSB receiver 100.

Then, the equalizer 102 and the noise remover 103 use the decision prediction signal and the decision control signal in decision (slicing) process for estimating a transmission signal upon equalizing or noise removal.

Figure 2:
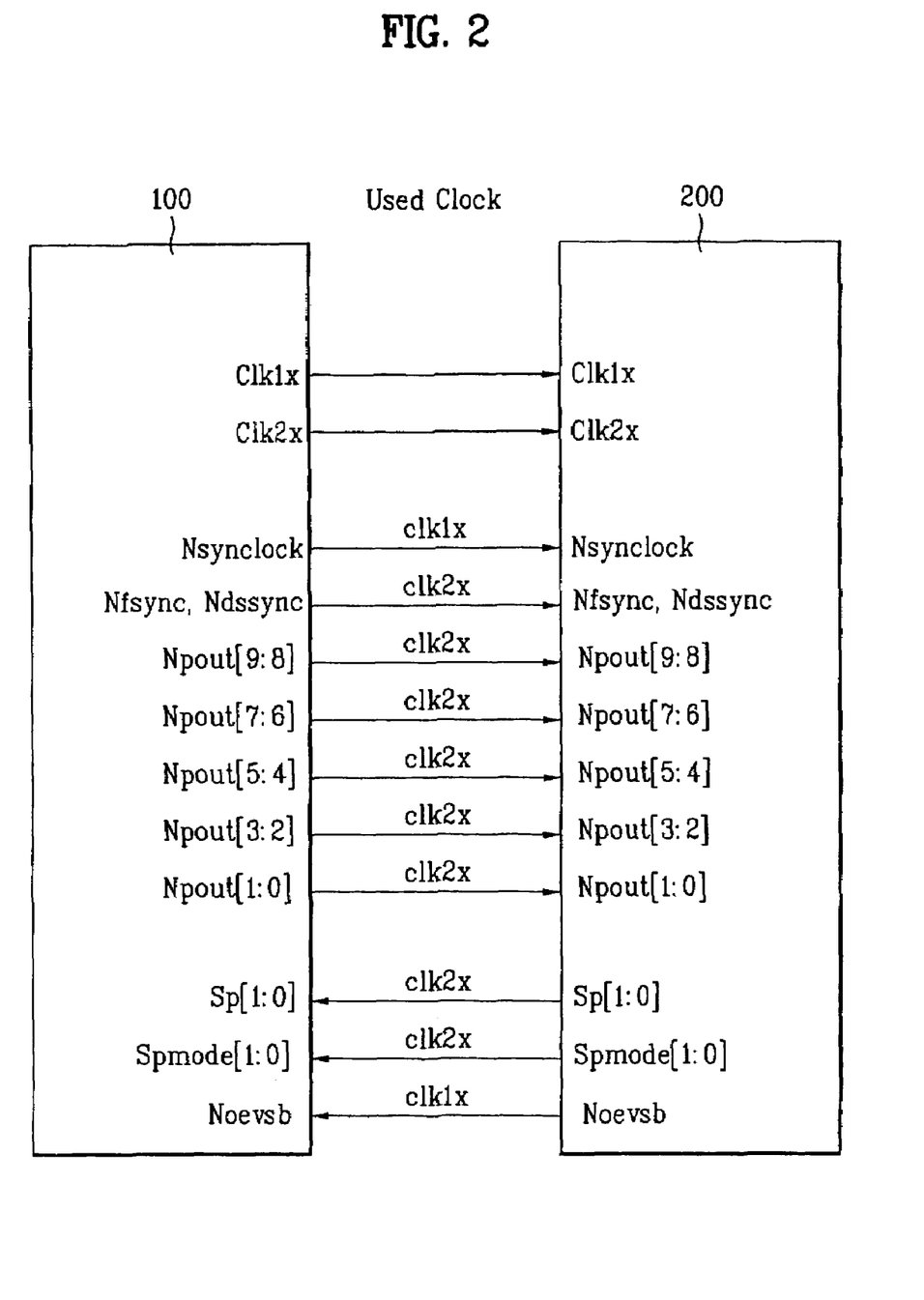
FIG. 2 is a view illustrating an example of an input and an output signals and transmission between a VSB reception chip and an enhanced data signal processing chip according to the present invention.

FIG. 2 is a view illustrating transmission process of signals inputted and outputted between the VSB receiver 100 and the enhanced data processor 200. At this point, the two clocks of the clk1x and the clk2x are directly delivered from the VSB receiver 100 to the enhanced data processor 200.

A synchronization lock signal Nsynclock representing that a signal is synchronized is synchronized with a first symbol clk1x and delivered from the VSB receiver 100 to the enhanced data processor 200. In addition, an Noevsb signal for delivering whether the enhanced data is present or not is synchronized with the first symbol clk1x and delivered from the enhanced data processor 200 to the VSB receiver 100. That is, the enhanced data processor 200 checks whether the enhanced data is present or not using the data outputted from the VSB receiver 100 and synchronizes the checked result with the first symbol clk1x to output the result to the VSB receiver 100.

In the meantime, each 2 bit of a field synchronization signal Nfsync, a segment synchronization signal Ndssync, data Npout outputted from the error corrector 104 of the VSB receiver 100 is synchronized with a twice faster speed than the symbol clock, i.e., a second symbol clock clk2x so as to reduce the number of pins of the two chips 100 and 200 and delivered to the enhanced data processor 200. Likewise, each 2 bit of a decision prediction signal Sp and a decision control signal Spmode generated at the enhanced data processor 200 is also synchronized with the second symbol clock clk2x and delivered to the VSB receiver 100.

Therefore, the number of pins for use in a signal transfer is reduced from 20 pins which has been required in case of transferring signals with only the first symbol clock speed clk1x to 12 pins of the present invention.

At this point, each chip 100 and 200 has, in its inside, a 1×2 symbol clock converter for converting two data synchronized with the first symbol clock into one data synchronized with the second symbol clock to transmit the converted data and a 2×1 symbol clock converter for converting one data transmitted with the second symbol clock speed into two data synchronized with the first symbol clock.

That is, the VSB receiver 100 has: the 1×2 symbol clock converter for converting data and a synchronization signal synchronized with the first symbol clock into data and a synchronization signal synchronized with the second symbol clock to output the converted data and signal to the enhanced data processor 200, and the 2×1 symbol clock converter for converting a decision prediction signal and a decision control signal outputted and synchronized with the second symbol clock at the enhanced data processor 200 into a decision prediction signal and a decision control signal synchronized with the first symbol clock.

The enhanced data processor 200 has: a 1×2 symbol clock converter for converting a decision prediction signal and a decision control signal synchronized with the first symbol clock into a decision prediction signal and a decision control signal synchronized with the second symbol clock to output the converted signals to the VSB receiver 100; and a 2×1 symbol clock converter for converting data and a synchronization signal outputted, at the VSB receiver 100, in synchronization with the second symbol clock into data and a synchronization signal synchronized with the first symbol clock.

Figure 3:
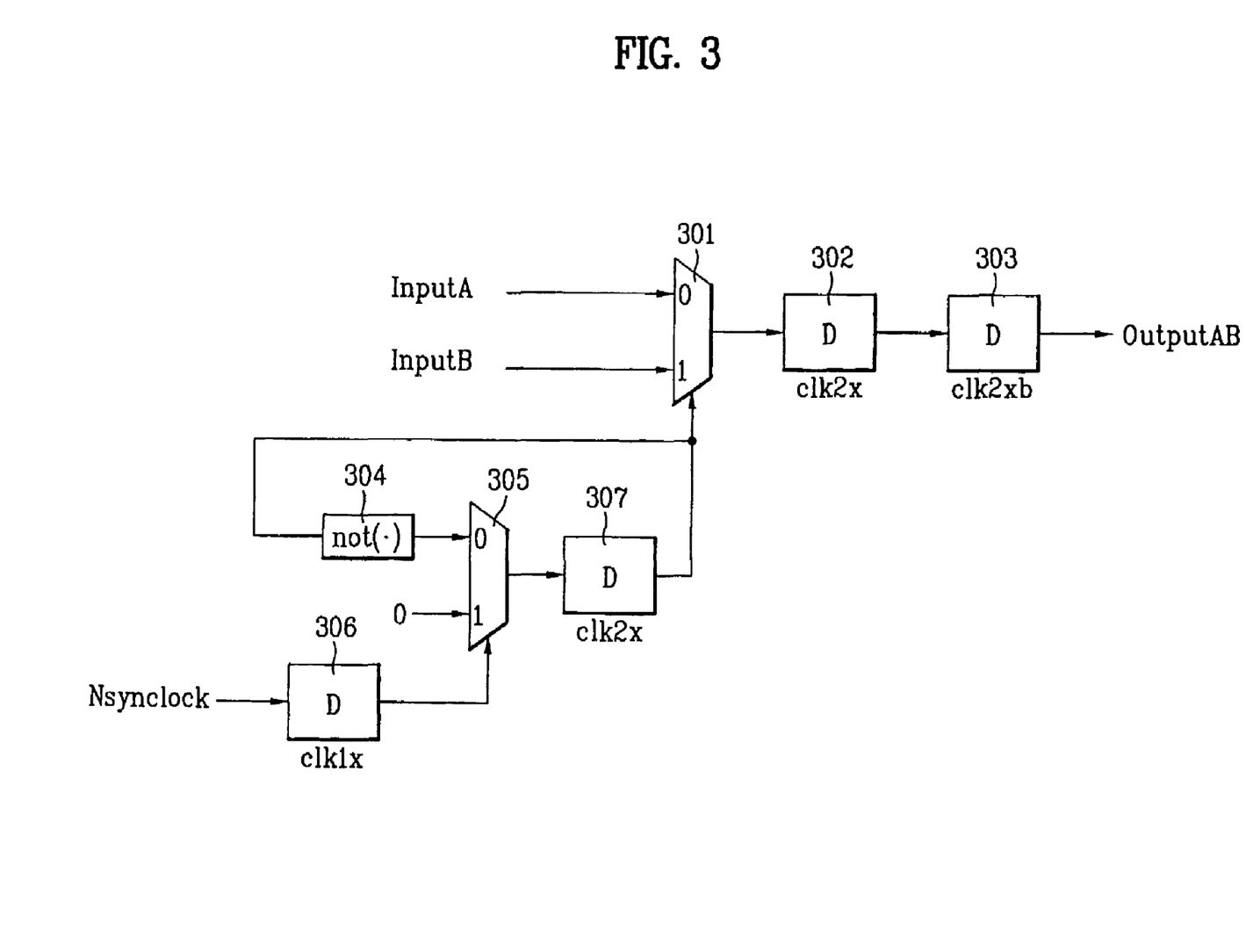
FIG. 3 is a detailed block diagram illustrating an example of a 1×2 symbol clock converter according to the present invention.

FIG. 3 is a detailed block diagram illustrating an example of a 1×2 symbol clock converter for converting two data synchronized with the first symbol clock into one data stream synchronized with the second symbol clock two times faster than the first symbol clock.

Referring to FIG. 3, the 1×2 symbol clock converter includes: a first selector 301 for alternately and selectively outputting two inputs, inputA and inputB synchronized with the first symbol clock clk1x using a first selection signal inverted every one period of the second symbol clock clk2x; a first delay 302 for storing and outputting the inputA and the inputB selectively outputted at the first selector 301 in synchronization with the second symbol clock; a second delay 303 for storing and outputting data outputted at the first delay 302 in synchronization with a clock clk2xb delayed a half period compared with the second symbol clock; a second selector 305 for selectively outputting an inverted output or '0' depending on the second selection signal; a third delay 306 for storing an Nsynclock signal in synchronization with the first symbol clock and outputting the Nsynclock signal to the second selector 305 as a second selection signal; a fourth delay 307 for storing the output of the second selector 305 in synchronization with the second symbol clock and outputting the output to the first selector as the first selection signal; and an inverter 304 for inverting the output of the fourth delay 307 to output the inverted output to an input of the second selector 305.

FIGS. 4A through 4G are timing diagrams of each element of the 1×2 symbol clock converter.

Figure 4:
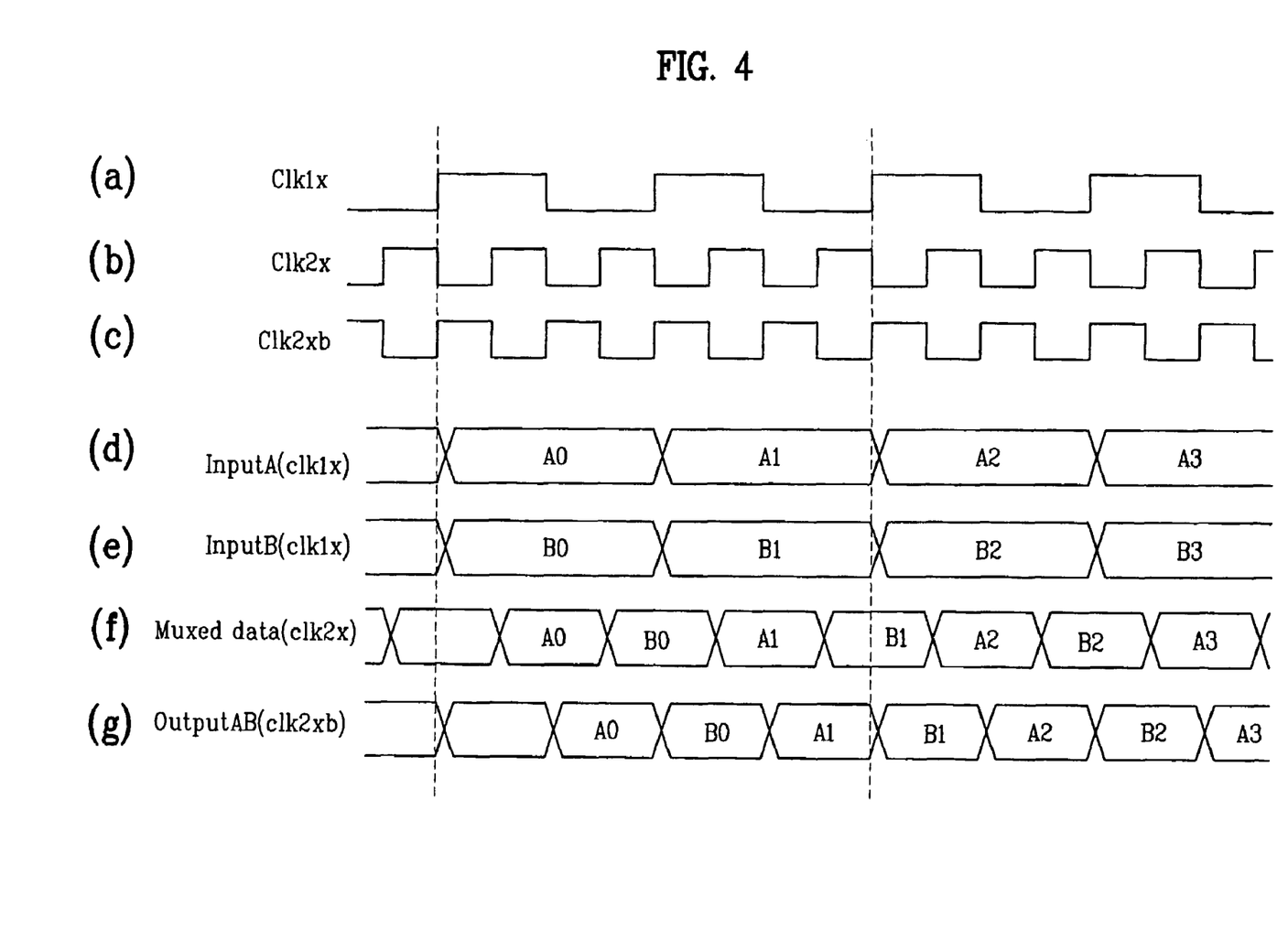
FIG. 4 is a timing diagram illustrating an operation of each element of the 1×2 symbol clock converter of FIG. 3.

That is, FIG. 4A illustrates an example of the first symbol clock clk1x and FIG. 4B illustrates an example of the second symbol clock clk2x. That is, the second symbol clock clk2x has, for its one period, a half of one period of the first symbol clock clk1x. FIG. 4C illustrates an example of a clock clk2xb where the second symbol clock is delayed a half period, namely, a clock which is deviated a half period from the second symbol clock clk2x.

The inputA and the inputB in FIG. 3 are 1-bit signals synchronized with the first symbol clock clk1x as illustrated in FIGS. 4D and 4E. Taking a least significant 2-bit Npout [1:0] as an example among data outputted from the VSB receiver 100, Npout[1] corresponds to the inputA and Npout [0] corresponds to the inputB and vice versa.

The synchronization lock signal Nsynchlock inputted to the third delay 306 maintains '1' if a signal is not synchronized and becomes '0' if a signal is synchronized.

The third delay 306 is a delay operating in synchronization with the first symbol clock. An output of the third delay 306 is outputted to the second selector 305 as a second selection signal.

The fourth delay 307 operating in synchronization with the second symbol clock is connected with an output terminal of the second selector 305. An output of the fourth delay 307 is outputted to the first selector 301 as a first selection signal and simultaneously inverted by an inverter 304 and inputted to the second selector 305.

The second selector 305 selects an output of the inverter 304 if the second selection signal from the third delay 306 is '0', i.e., if a signal is synchronized, and selects '0' to output the selected signal to the fourth delay 307 if the second selection signal is '1', i.e., if a signal is not synchronized.

The first selector 301 alternately selects the two inputs, the inputA and the inputB using the first selection signal from the fourth delay 307 inverted every one period of the second symbol clock and outputs the signal to the first delay 302 as illustrated in FIG. 4F. That is, the inputA and the inputB, which are input data respectively synchronized with the first symbol clock are converted into muxed data synchronized with the second symbol clock by the first selector 301. The muxed data is the same as outputAB, which is data outputted, at the second delay 303 in synchronization with a clock clk2xb that is deviated a half period from the second symbol clock.

Figure 5:
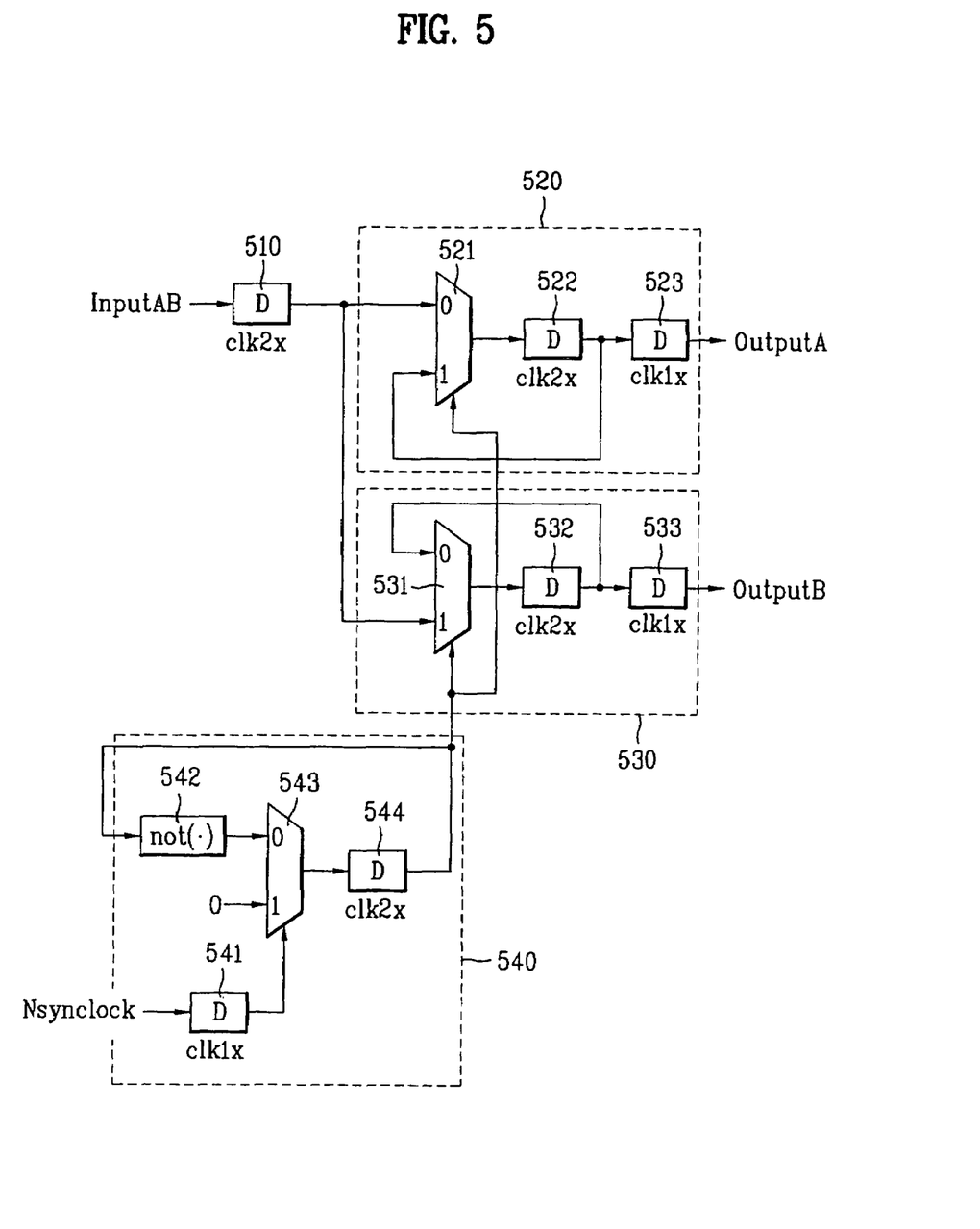
FIG. 5 is a detailed block diagram illustrating an example of a 2×1 symbol clock converter according to the present invention.

That is, the first delay 302 is synchronized with the second symbol clock to store an output of the first selector 301 and output the same to the second delay 303. The second delay 303 is synchronized with the clk2xb which is delayed a half period compared with the second symbol clock to store the output of the first delay 302 and output the same as illustrated in FIG. 4G. Resultantly, the second delay 303 outputs the inputA for one period of the second symbol clock and the inputB for the other one period of the second symbol clock. That is, since the inputA is outputted for one half period of the first symbol clock and the inputB is outputted for the other half period of the first symbol clock, it has the same effect that the two inputs of the inputA and the inputB are multiplexed as the outputAB and outputted for one period of the first symbol clock FIG. 5 is a detailed block diagram illustrating an example of the 2×1 symbol clock converter for converting one data transmitted in synchronization with the second symbol clock into two data synchronized with the first symbol clock. A method for generating a selection signal for use in selecting and storing data is the same as the method illustrated in FIG. 3.

Referring to FIG. 5, the 2×1 symbol clock converter includes: a delay 510 for synchronizing data inputAB synchronized with the second symbol clock with the second symbol clock and outputting the synchronized data; a first data output unit 520 for separating and outputting first data inputA synchronized with the first symbol clock from the output of the delay 510 depending on a third selection signal; a second data output unit 530 for separating and outputting second data inputB synchronized with the second symbol clock from the output of the delay 510 depending on the third selection signal; and a selection signal generator 540 for receiving a synchronization lock signal Nsynclock to generate the third selection signal inverted every one period of the second symbol clock and output the generated signal to the first and the second data output units 520 and 530.

The first data output unit 520 includes: a selector 521 for selectively outputting either the output of the delay 510 or previous first data provided as a feedback in synchronization with the second symbol clock depending on the third selection signal outputted from the selection signal generator 540; a delay 522 for storing the output of the selector 521 in synchronization with the second symbol clock and providing the stored output to the selector 521 as a feedback; and a delay 523 for storing the output of the delay 522 in synchronization with the first symbol clock and outputting the stored output as first data. That is, the first data is data outputA synchronized with the first symbol clock and separated from the input data inputAB synchronized with the second symbol clock.

The second data output unit 530 includes: a selector 531 for selectively outputting either the output of the delay 510 or previous second data provided as a feedback in synchronization with the second symbol clock depending on the first selection signal outputted from the selection signal generator 540; a delay 532 for storing the output of the selector 531 in synchronization with the second symbol clock and providing the stored output to the selector 531 as a feedback; and a delay 533 for storing the output of the delay 532 in synchronization with the first symbol clock and outputting the stored output as second data. That is, the second data is data outputB synchronized with the first symbol clock and separated from the input data inputAB synchronized with the second symbol clock.

The selection signal generator 540 includes: a selector 543 for selectively outputting an inverted output or '0' depending on a fourth selection signal; a delay 541 for storing a synchronization lock signal Nsynclock in synchronization with the first symbol clock and outputting the stored signal as the fourth selection signal to the selector 543; a delay 544 for storing the output of the selector 543 in synchronization with the second symbol clock and outputting the stored output to the first and the second data output units 520 and 530 as a third selection signal; and an inverter 542 for inverting the output of the delay 544 to provide the inverted output as an input of the selector 543.

Figure 6:
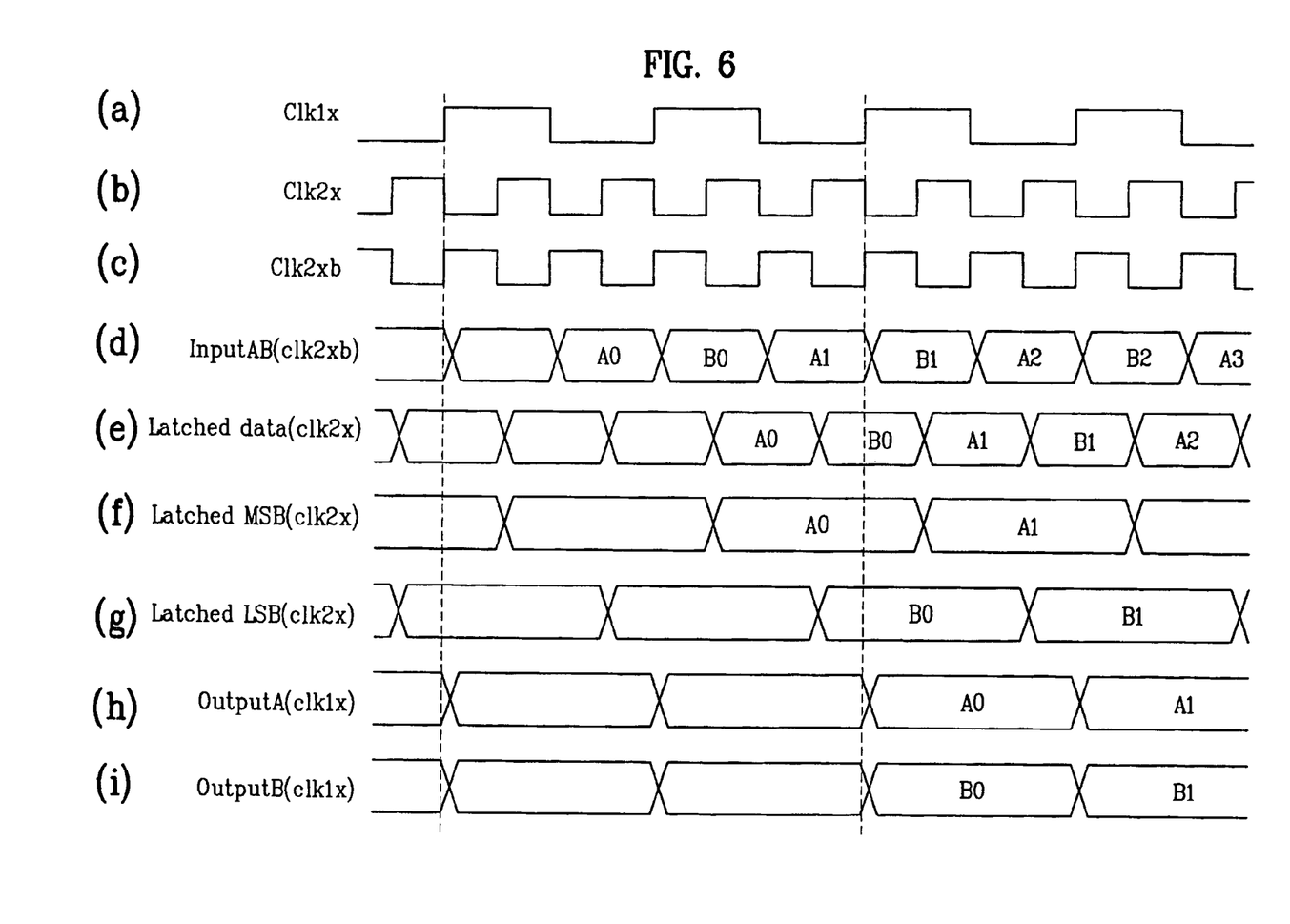
FIG. 6 is a timing diagram illustrating an operation of each element of the 2×1 symbol clock converter of FIG. 5.

FIGS. 6A through 6I are timing diagrams of each element of the 2×1 symbol clock converter. That is, FIG. 6A illustrates an example of the first symbol clock clk1x, FIG. 6B illustrates an example of the second symbol clock clk2x, and FIG. 6C illustrates an example of a clock clk2xb deviated a half period from the second symbol clock.

In FIG. 5, the data stream inputAB synchronized with the second symbol clock is divided into two data synchronized with the first symbol clock, the outputA and the outputB.

At this point, the inputA and the inputB are combined to one data stream such as the outputAB at the 1×2 symbol clock converter of FIG. 3 and the outputAB is synchronized with a clock clk2xb deviated a half period from the second symbol clock and outputted to the 2×1 symbol clock converter as illustrated in FIG. 6D. Here, the data stream outputAB outputted from the 1×2 symbol clock converter and the data stream inputAB inputted to the 2×1 symbol clock converter are the same data.

The input data stream inputAB is stored in the delay 510 and then synchronized with the second symbol clock as illustrated in FIG. 6E and provided to one input terminal of each selector 521 and 531 of the first and the second data output units 520 and 530. That is, the inputted data stream inputAB becomes the same as latched data by the delay 510 synchronized with the second symbol clock.

In addition, an Nsynclock signal inputted to the delay 541 of the selection signal generator 540 maintains '1' if a signal is not synchronized and becomes '0' if a signal is synchronized.

The delay 541 is a delay operating in synchronization with the first symbol clock and an output of the delay 541 is outputted as a fourth selection signal to the selector 543. A delay 544 operating in synchronization with the second symbol clock is connected with an output terminal of the selector 543. An output of the delay 544 is outputted to the first and the second data output units 520 and 530 as a third selection signal and simultaneously inverted by an inverter 542 and inputted to a selector 543.

The selector 543 selects an output of the inverter 542 if the fourth selection signal from the delay 544 is '0', i.e., if a signal is synchronized, and selects '0' to output the selected signal to the delay 544 if the fourth selection signal is '1', i.e., if a signal is not synchronized.

In the meantime, the selector 521 of the first data output unit 520 selects input data inputAB from the delay 510 if the third selection signal inverted every one period of the second symbol clock is '0', and selects previous first data provided as a feedback from the delay 522 to output the previous first data to the delay 522 if the third selection signal is '1'. The delay 522 operates in synchronization with the second symbol clock and stores the output of the selector 521 and provides the output to the selector 521 as a feedback, simultaneously outputting the same to the delay 523. That is, the selector 521 selects and outputs the previous data stored in the delay 522 and provided to the selector 521 as a feedback if the third selection signal is '1'.

The delay 523 stores the output of the delay 522 and outputs the first data inputA in synchronization with the first symbol clock.

Likewise, the selector 531 of the second data output unit 530 selects previous second data provided as a feedback from the delay 532 if the third selection signal inverted every one period of the second symbol clock is '0' and selects input data inputAB from the delay 510 to output the input data inputAB to the delay 532 if the third selection signal is '1'. The delay 532 operates in synchronization with the second symbol clock and stores the output of the selector 531 and provides the output to the selector 531 as a feedback, simultaneously outputting the same to the delay 533. The delay 533 stores the output of the delay 532 in synchronization with the first symbol clock and outputs second data outputB.

That is, by applying the selectors 521 and 531 of the first and the second data output units 520 and 530 and the delays 522 and 532 synchronized with the second symbol clock to the outputs of the delay 510, the output inputAB of the delay 540 is divided into the two data streams of most significant bit (MSB) data (latched MSB; inputA) as illustrated in FIG. 6F and least significant bit (LSB) data (latched LSB; inputB) as illustrated in FIG. 6G. If the output data of the delay 522 goes through the delay 523 synchronized with the first symbol clock and the output data of the delay 532 goes through the delay 533 synchronized with the first clock, the output data is converted into the two data streams of the outputA and the outputB synchronized with the first symbol clock and outputted.

If the VSB receiver 100 and the enhanced data processor 200 use the 1×2 symbol clock converter of FIG. 3 and the 2×1 symbol clock converter of FIG. 5 respectively when transmitting data between the VSB receiver 100 and the enhanced data processor 200 with a twice faster speed than the symbol clock, a total time delay becomes two symbol periods as illustrated in a total latency of FIG. 6.

In addition, the present invention can reduce the number of pins up to 40% by raising a transmission speed between the VSB reception chip and the enhanced data processing chip as much as twice faster than the symbol clock.

As described above, the E8-VSB reception system according to the present invention can reduce the number of pins and a chip size by transmitting a data signal with a twice faster speed than the symbol clock for signal transfer between the VSB reception chip manufactured under the existing standard and the enhanced data processing chip, which is a standard for an improved performance.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An E8-VSB (enhanced 8-vestigial sideband) reception system for receiving and processing data where main data and enhanced data are multiplexed and transmitted, the system comprising:

a VSB receiver for converting a received broadcast signal of a predetermined channel into a digital baseband signal in synchronization with a first symbol clock, converting a decision signal synchronized with a second symbol clock into a decision signal synchronized with the first symbol clock, performing a channel equalizing, noise removal on the digital baseband signal using the converted decision signal, and an error correction on the noise removed signal, and outputting error-corrected data and a synchronization signal in synchronization with the first symbol clock and the second symbol clock; and an enhanced data processor for receiving the data and the synchronization signal in synchronization with the first symbol clock and the second symbol clock from the VSB receiver, extracting enhanced data from the data according to the synchronization signal, performing E8-VSB decoding and error correction, and outputting the decision signal synchronized with the second symbol clock to the VSB receiver.

2. The system of claim 1, wherein the VSB receiver comprises:

a 1×N symbol clock converter for converting the data and the synchronization signal synchronized with the first symbol clock into data and a synchronization signal synchronized with a second symbol clock N times faster than the first symbol clock in order to output the converted data and synchronization signal to the enhanced data processor; and an N×1 symbol clock converter for converting the decision signal output by the enhanced data processor, in synchronization with the second symbol clock into the decision signal synchronized with the first symbol clock, wherein the decision signal includes at least a decision prediction control signal.

3. The system of claim 1, wherein the enhanced data processor comprises:

a 1×N symbol clock converter for converting the decision signal synchronized with the first symbol clock into the decision signal synchronized with the second symbol clock N times faster than the first symbol clock in order to output the converted decision signal to the VSB receiver, wherein the decision signal includes at least a decision prediction signal or a decision control signal; and an N×1 symbol clock converter for converting the data and the synchronization signal output by the VSB receiver in synchronization with the second symbol clock into the data and the synchronization signal synchronized with the first symbol clock.

4. An E8-VSB (enhanced 8-vestigial sideband) reception system for receiving and processing data where main data and enhanced data are multiplexed and transmitted, the system comprising:
a VSB receiver for converting a received broadcast signal of a predetermined channel into a digital baseband signal in synchronization with a first symbol clock, converting a decision signal synchronized with a second symbol clock twice faster than the first symbol clock into a decision signal synchronized with the first symbol clock, performing a channel equalizing, a noise removal on the digital baseband signal using the converted decision signal, and an error correction on the noise removed signal, and outputting error-corrected data and a synchronization signal in synchronization with the first symbol clock and the second symbol clock; and
an enhanced data processor for receiving the data and the synchronization signal in synchronization with the first symbol clock and the second symbol clock from the VSB receiver, extracting enhanced data from the data according to the synchronization signal, performing E8-VSB decoding and error correction, and outputting the decision signal synchronized with the second symbol clock to the VSB receiver.

5. The system of claim 4, wherein the VSB receiver outputs a synchronization lock signal Nsynclock representing that a signal is synchronized to the enhanced data processor in synchronization with the first symbol clock.

6. The system of claim 4, wherein the enhanced data processor synchronizes the decision signal generated in synchronization with the first symbol clock while decoding the enhanced data, with the second symbol clock in order to output the decision signal to the VSB receiver, wherein the decision signal includes at least a decision prediction signal or a decision control signal.

7. The system of claim 4, wherein the enhanced data processor checks whether the enhanced data is included in the data outputted from the VSB receiver and synchronizes an Noevsb signal representing the checking result with the first symbol clock to output the Noevsb signal to the VSB receiver.

8. The system of claim 4, wherein the VSB receiver comprises:
a 1×2 symbol clock converter for converting the data and the synchronization signal synchronized with the first symbol clock into the data and the synchronization signal synchronized with the second symbol clock twice faster than the first symbol clock in order to output the converted data and synchronization signal to the enhanced data processor; and
a 2×1 symbol clock converter for converting the decision signal output by the enhanced data processor in synchronization with the second symbol clock into the decision signal synchronized with the first symbol clock, wherein the decision signal includes at least a decision prediction signal or a decision control signal.

9. The system of claim 8, wherein the 1×2 symbol clock converter comprises:
a first selector for sequentially multiplexing and outputting first and second data inputA and inputB inputted in synchronization with the first symbol clock using a first selection signal inverted every one period of the second symbol clock;
a first delay for storing the first and the second data multiplexed and outputted, at the first selector, in synchronization with the second symbol clock and outputting the stored multiplexed data;
a second delay for storing the multiplexed data outputted, at the first delay, in synchronization with a clock half-period delayed compared to the second symbol clock and outputting the stored multiplexed data; and
a selection signal generator for receiving a synchronization lock signal Nsynclock synchronized with the first symbol clock to generate the first selection signal inverted every one period of the second symbol clock and output the generated first selection signal to the first selector.

10. The system of claim 9, wherein the selection signal generator comprises:
a second selector for selectively outputting an inverted output or '0' depending on a second selection signal;
a third delay for storing the synchronization lock signal Nsynclock for outputting '0' or '1' depending on whether a signal is synchronized and outputting the Nsynclock signal to the second selector as a second selection signal in synchronization with the first symbol clock;
a fourth delay for storing the output of the second selector in synchronization with the second symbol clock and outputting the output of the second selector to the first selector as the first selection signal; and
an inverter for inverting the output of the fourth delay to output the inverted output to one input of the second selector.

11. The system of claim 8, wherein the 2×1 symbol clock converter comprises:
a delay for receiving and storing a data stream inputAB multiplexed in synchronization with the second symbol clock and outputting the stored data stream in synchronization with the second symbol clock;
a first data output unit for separating and outputting first data inputA synchronized with the first symbol clock from the output of the delay according to a third selection signal;
a second data output unit for separating and outputting second data inputB synchronized with the second symbol clock from the output of the delay according to the third selection signal; and
a selection signal generator for receiving a synchronization lock signal Nsynclock synchronized with the first symbol clock to generate the third selection signal inverted every one period of the second symbol clock and output the generated third selection signal to the first and the second data output units.

12. The system of claim 11, wherein the first data output unit comprises:
a first selector for selecting the output of the delay if the third selection signal outputted from the selection signal generator is '0' and selecting previous first data provided as a feedback if the third selection signal is '1';
a first delay for storing the output of the first selector in synchronization with the second symbol clock and inputting the stored output to the first selector as the feedback; and
a second delay for storing the output of the first delay in synchronization with the first symbol clock and outputting the stored output as the first data inputA.

13. The system of claim 11, wherein the second data output unit comprises:
a second selector for selecting previous second data provided as a feedback if the third selection signal outputted from the selection signal generator is '0' and selecting the output of the delay if the third selection signal is '1';
a third delay for storing the output of the second selector in synchronization with the second symbol clock and inputting the stored output to the second selector as the feedback; and
a fourth delay for storing the output of the third delay in synchronization with the first symbol clock and outputting the stored output as the second data inputB.

14. The system of claim 11, wherein the selection signal generator comprises:
a third selector for selectively outputting an inverted output or '0' depending on a fourth selection signal;
a fifth delay for storing a synchronization lock signal Nsynclock for outputting '0' or '1' depending on whether a signal is synchronized and outputting the Nsynclock signal to the third selector as the fourth selection signal in synchronization with the first symbol clock;
a sixth delay for storing the output of the third selector in synchronization with the second symbol clock and outputting the output of the third selector to the first and the second data output units as the third selection signal; and
an inverter for inverting the output of the sixth delay to output the inverted output to one input of the third selector.

15. The system of claim 4, wherein the enhanced data processor comprises:
a 1×2 symbol clock converter for converting the decision signal synchronized with the first symbol clock into the decision signal synchronized with the second symbol clock twice faster than the first symbol clock in order to output the converted decision signal to the VSB receiver, wherein the decision signal includes at least a decision prediction signal or a decision control signal; and
a 2×1 symbol clock converter for converting the data and the synchronization signal output by the VSB receiver in synchronization with the second symbol clock into the data and the synchronization signal synchronized with the first symbol clock.

16. The system of claim 15, wherein the 1×2 symbol clock converter comprises:
a first selector for sequentially multiplexing and outputting first and second data inputA and inputB inputted in synchronization with the first symbol clock using a first selection signal inverted every one period of the second symbol clock;
a first delay for storing the first and the second data multiplexed and outputted, at the first selector, in synchronization with the second symbol clock and outputting the stored multiplexed data;
a second delay for storing the multiplexed data outputted, at the first delay, in synchronization with a clock half-period delayed compared to the second symbol clock and outputting the stored multiplexed data; and
a selection signal generator for receiving a synchronization lock signal Nsynclock synchronized with the first symbol clock to generate the first selection signal inverted every one period of the second symbol clock and output the generated first selection signal to the first selector.

17. The system of claim 16, wherein the selection signal generator comprises:
a second selector for selectively outputting an inverted output or '0' depending on a second selection signal;
a third delay for storing the synchronization lock signal Nsynclock for outputting '0' or '1' depending on whether a signal is synchronized and outputting the Nsynclock signal to the second selector as the second selection signal in synchronization with the first symbol clock;
a fourth delay for storing the output of the second selector in synchronization with the second symbol clock and outputting the output of the second selector to the first selector as the first selection signal; and
an inverter for inverting the output of the fourth delay to output the inverted output to one input of the second selector.

18. The system of claim 15, wherein the 2×1 symbol clock converter comprises:
a delay for receiving and storing a data stream inputAB multiplexed in synchronization with the second symbol clock and outputting the stored data stream in synchronization with the second symbol clock;
a first data output unit for separating and outputting first data inputA synchronized with the first symbol clock from the output of the delay according to a third selection signal;
a second data output unit for separating and outputting second data inputB synchronized with the second symbol clock from the output of the delay according to the third selection signal; and
a selection signal generator for receiving a synchronization lock signal Nsynclock synchronized with the first symbol clock to generate the third selection signal inverted every one period of the second symbol clock and output the generated third selection signal to the first and the second data output units.

19. The system of claim 18, wherein the selection signal generator comprises:
a selector for selectively outputting an inverted output or '0' depending on a fourth selection signal;
a first delay for storing a synchronization lock signal Nsynclock for outputting '0' or '1' depending on whether a signal is synchronized and outputting the Nsynclock signal to the selector as the fourth selection signal in synchronization with the first symbol clock;
a second delay for storing the output of the selector in synchronization with the second symbol clock and outputting the output of the selector to the first and the second data output units as the third selection signal; and
an inverter for inverting the output of the second delay to output the inverted output to one input of the selector.

* * * * *